United States Patent

Washimi et al.

[11] Patent Number: 4,645,213
[45] Date of Patent: Feb. 24, 1987

[54] NON-CONTACT TYPE SEAL DEVICE FOR TURBOCHARGER

[75] Inventors: Kouichi Washimi; Makoto Shibata; Mitsuyuki Ugajin, all of Aichi, Japan

[73] Assignees: Taiho Kogyo Co., Ltd.; Toyota Motor Corporation, both of Aichi, Japan

[21] Appl. No.: 749,967

[22] Filed: Jun. 28, 1985

[30] Foreign Application Priority Data

Jun. 28, 1984 [JP] Japan .................................. 59-131882

[51] Int. Cl.⁴ ........................................... F16J 15/447
[52] U.S. Cl. ....................................... 277/53; 277/133; 277/203
[58] Field of Search ..................... 277/53–57, 277/133, 134, 203, 207 R, 208

[56] References Cited

U.S. PATENT DOCUMENTS 4,296,934  10/1981  Atkin ................................. 277/53 X
4,523,763  6/1985   Asano et al. ...................... 277/53 X

FOREIGN PATENT DOCUMENTS 58-51294  3/1983  Japan ..................................... 277/53
58-57563  4/1983  Japan ..................................... 277/53
40233     4/1907  Switzerland ......................... 277/54

Primary Examiner—Robert S. Ward
Attorney, Agent, or Firm—Sughrue, Mion, Zinn, Macpeak and Seas

[57] ABSTRACT

A non-contact type seal device for a turbocharger in which lubricating oil is prevented from leaking into the compression chamber of the turbocharger over the entire range of rotational speeds thereof. The seal device of the invention includes a retainer mounted in a compression chamber of a housing of the turbocharger, a collar attached to a compressor wheel mounting portion of the rotor shaft of the turbocharger, and a ring provided on an inner peripheral surface of the retainer. An annular groove receiving the ring is formed in the outer peripheral surface of the collar. A first gap is formed between the outer peripheral surface of the collar and the inner peripheral surface of the retainer, while a second gap is formed between the inner surface of the annular groove and each of the inner and outer end surfaces of the ring. A threaded groove is formed in the inner peripheral surface of the retainer in opposition to the outer peripheral surface of the collar.

4 Claims, 11 Drawing Figures

NON-CONTACT TYPE SEAL DEVICE FOR TURBOCHARGER

BACKGROUND OF THE INVENTION

The present invention relates to a non-contact type seal device for a turbocharger, and more particularly to a non-contact type seal device for preventing lubricating oil from leaking into a compressor chamber of a turbocharger.

Referring to FIGS. 1 and 2, the general arrangement of a prior art turbocharger will be described.

A housing 1 of the turbocharger is constituted by a turbine housing 2, a bearing housing 3, and a compressor housing 4. A rotor shaft 7, having a turbine wheel 5 and a compressor wheel 6 provided at its opposite ends, is rotatably supported by the bearing housing 3 through full-float bearings 8 and a thrust bearing 9. Lubricating oil for the full-float bearings 8 and the thrust bearing 9 is supplied into the bearing housing 3. A non-contact type seal device for preventing the lubricating oil from entering a compressor chamber 1a is also provided.

Referring specifically to FIG. 2, the non-contact type seal device includes a ring 11 provided on an inner peripheral surface 10a of a retainer 10, the latter being provided on the compressor chamber 1a side of the housing 1, and an annular groove 13 for receiving the ring 11 is formed in the outer peripheral surface 12a of the collar 12 fixed on the fitting portion side of a compressor wheel of the rotor shaft 7 by press-fitting or fastening. A gap is formed between the outer peripheral surface 12a of the collar 12 and the inner peripheral surface 10a of a retainer 10, and another gap is formed between the inner surface of the annular groove 13 and each of the opposite end surfaces and inner peripheral surface of the ring 11.

Although a so-called labyrinth seal structure is provided to prevent lubricating oil from entering the compression chamber 1a, there is a possibility that the lubricating oil will enter the compressor chamber 1a from a lubricating oil chamber 1c through the gap between the annular groove 13 of the collar 12 and the ring 11 of the inner peripheral surface 10a of the retainer 10 because of the pressure difference which exists between a turbine chamber 16 and the compressor chamber 1a under conditions of high negative pressure. This leakage causes an increase in consumption of the lubricating oil.

SUMMARY OF THE INVENTION

An object of the present invention is to eliminate the foregoing disadvantages of the prior art.

Another object of the present invention is to provide a non-contact type seal device in which the sealing properties for preventing lubricating oil from leaking into a compressor chamber of a turbocharger are improved.

In accordance with the foregoing and other objects, according to one aspect of the present invention, a non-contact type seal device for a turbocharger is provided which comprises a ring provuded on an inner peripheral surface of a retainer mounted in a compressor chamber of a housing. An annular groove for receiving the ring is formed in an outer peripheral surface of a collar attached to a compressor wheel mounting portion of a rotor shaft. A gap is formed between the outer peripheral surface of the collar and the inner peripheral surface of the retainer, and another gap is formed between the inner surface of the annular groove and each of the inner and opposite end surfaces of the ring. A threaded groove is formed in the inner peripheral surface of the retainer in opposition to the outer peripheral surface of the collar.

Other objects, features, and advantages of the present invention will be apparent from the following description taken in conjunction with the accompanying drawings.

DESCRIPTION OF THE PREFERRED EMBODIMENTS

Referring to FIGS. 3 to 7, preferred embodiments of the present invention will be described hereunder.

Figure 1:
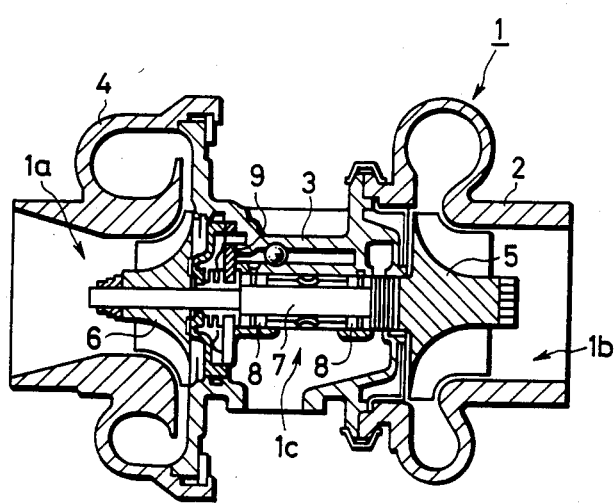
FIG. 1 is a longitudinal cross section of a turbocharger provided with a conventional non-contact type seal device.
Figure 2:
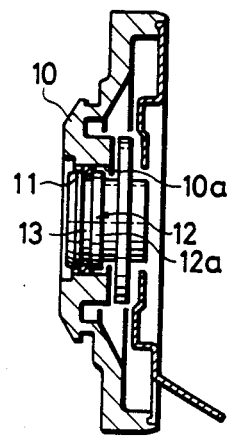
FIG. 2 is an enlarged cross section of the conventional non-contact type seal device shown in FIG. 1.
Figure 3:
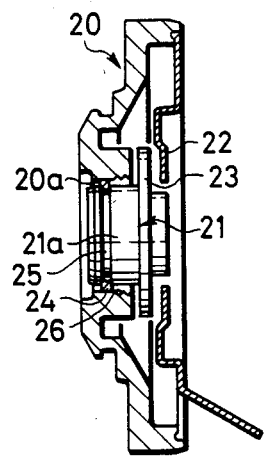
FIG. 3 is a longitudinal cross section of an embodiment of a non-contact type seal device for a turbocharger according to the present invention.
Figure 4:
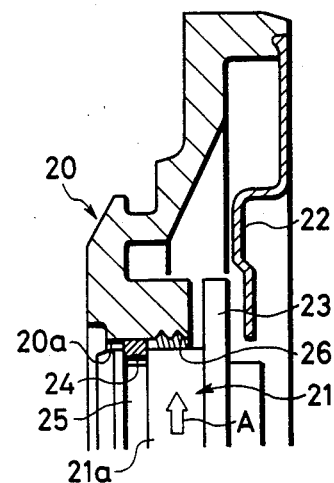
FIG. 4 is an enlarged cross section of the conventional non-contact type seal device shown in FIG. 3.

In FIGS. 3 and 4, a non-contact type seal device for preventing lubricating oil from entering a compressor chamber of a turbocharger is provided with a retainer 20 and a collar 21 which are respectively attached to a housing of the turbocharger and to a rotor shaft in the same manner as the non-contact type seal device shown in FIG. 1. The retainer 20 is provided with a deflector 22, and the collar 21 is provided with a slinger portion 23 opposed to the deflector 22. A ring 24 is provided on an inner peripheral surface 20a of the retainer 20. Although the ring 24 may be formed integrally with the retainer 20, the separately formed ring 24 is fixed by press-fitting or the like onto the inner peripheral surface 20a of the retainer 20 in this embodiment. An annular groove 25 for receiving the ring 24 is formed in the outer peripheral surface 21a of the collar 21. An annular gap for preventing the retainer 20 and the collar 21 from contacting each other is formed between the inner peripheral surface 20a of the retainer 20 and the outer peripheral surface 21a of the collar 21, and another gap for preventing the ring 24 and the collar 21 from contacting each other is formed between the inner peripheral surface of the annular groove 25 of the collar 21 and each of the opposite end surfaces and inner peripheral surface of the ring 24. In FIGS. 3 and 4, a compressor chamber and a lubricating oil chamber adjacent to a turbine chamber are defined on the left and right sides of the ring 24, respectively.

As shown in detail in FIG. 4, a threaded groove 26, extending parallel to the outer peripheral surface 21a of the collar 21, is formed in the lubricating oil chamber side inner peripheral surface 20a of the retainer 20. In this case, the threaded groove 26 is arranged such that, when the collar 21 integrated with the rotor shaft rotates in the direction indicated by an arrow A, the threaded groove 26 spirals from the ring 24 side to the lubricating chamber side.

Accordingly, in this embodiment, when the collar 21 rotates with the rotor shaft at a high speed in the direction of the arrow A, the lubricating oil flowing from a portion between the deflector 22 and the slinger 23 into a portion between the outer peripheral surface 21a of the collar 21 and the inner peripheral surface 20a of the retainer 20 is guided by the threaded groove 26 to be urged back toward the lubricating oil chamber, namely, rightwardly in FIGS. 3 and 4. That is, the threaded groove 26 performs a pumping operation to urge the lubricating oil into the lubricating oil chamber in cooperation with the collar 21. Thus, the lubricating oil is prevented from entering the compressor chamber through the gap between the ring 24 and the annular groove 25 of the collar 21 so that a sealing effect can be guaranteed at the ring 24 portion.

Figure 5:
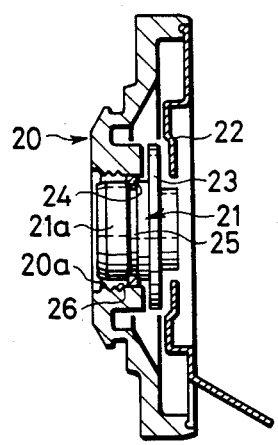
FIG. 5 is a longitudinal cross section of another embodiment of a non-contact type seal device for a turbocharger according to the present invention.
Figure 6:
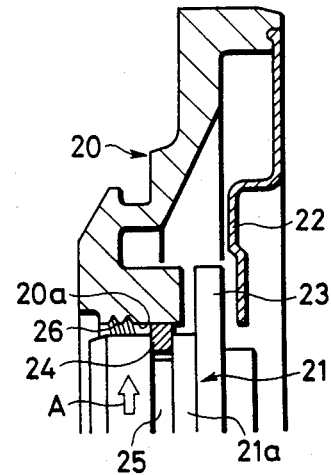
FIG. 6 is an enlarged cross section of the conventional non-contact type seal device shown in FIG. 5.

Another embodiment is illustrated in FIGS. 5 and 6, in which components the same in the first embodiment are referenced correspondingly.

In this embodiment, a threaded groove 26 is formed in the inner peripheral surface 20a of a retainer 20 provided at a compressor chamber side. The advancing direction of the thread of the threaded groove 26 relative to the rotational direction of a collar 21 is the same as in the first embodiment described above. In this embodiment, gas at the compressor chamber side is guided by the threaded groove 26 to be supplied to the ring 24 side as the collar 1 rotates in the direction of the arrow A so that the pressure difference between the opposite sides of the ring 24 becomes small, resulting in a sufficient labyrinth effect at the ring 24 to thereby prevent the lubricating oil from entering the compressor chamber from the lubrication oil chamber. Thus, an excellent sealing effect at the ring 24 portion is ensured.

The threaded groove 26 may be formed in the inner peripheral surface 20a of the retainer 20 at both sides of the ring 24.

Figure 7A:
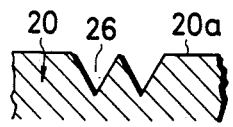
FIG. 7A to FIG. 7E are cross-sections each showing the cross-sectional configuration of a threaded groove formed in the inner surface of a retainer.
Figure 7B:
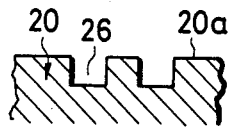
Figure 7C:
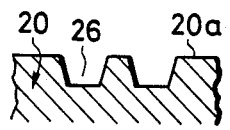
Figure 7D:
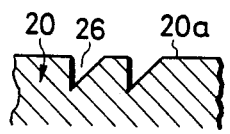
Figure 7E:
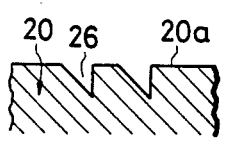

The cross-sectional shape of the threaded groove 26 may be selected from among those shown in FIGS. 7A to 7E, that is, from among a triangular cross section, a square cross section, a trapezoidal cross section, a sawtooth cross section with one side perpendicular to the inner peripheral surface 20a of the retainer 20, etc. Alternatively, the cross section of the threaded groove 26 may be in the form of a circular arc or the like. The shapes of the grooves shown in FIGS. 7D and 7E are preferable because the accuracy required in manufacturing can be lowered.

It is preferable to form the threaded groove 26 with one or more turns in the inner peripheral surface 20a of the retainer 20. However, the threaded groove 26 is not always restricted to a single groove thread, and may be constituted by a plurality of groove threads formed in the inner peripheral surface of the retainer 20.

Comparing the seal device of the present invention with a conventional seal device, in the former case it has been confirmed that a good and sufficient sealing effect is obtained even for high-speed rotation, while in the case of the latter, there is a possibility that the sealing capability will be insufficient, even for intermediate rotational speeds.

Further, the axial pressure generated during high-speed rotation is received on the housing side through the retainer because the threaded groove is formed in the inner peripheral surface of the retainer, and thus it is possible to achieve good sealing without applying any unnecessary pressure to the rotor shaft.

As explained above, according to the present invention, a non-contact type seal device for a turbocharger is provided in which a ring is provided on an inner peripheral surface of a retainer mounted in a compressor chamber of a housing. An annular groove for receiving the ring is formed in an outer peripheral surface of a collar attached to a compressor wheel mounting portion of a rotor shaft. A gap is formed between the outer peripheral surface of the collar and the inner peripheral surface of the retainer, and another gap is formed between the inner surface of the annular groove and each of the inner and opposite and surfaces of the ring. A threaded groove is formed in the inner peripheral surface of the collar. With this construction, the sealing effects at the opposite sides of the ring due to the threaded groove prevent the lubricating oil from leaking into the lubricating oil chamber when the rotor shaft is rotating. Moreover, with the invention, it is not necessary to provide further means for guiding gases from compressor chamber. Also, good sealing performance at the ring portion, etc., is always ensured, and the lubricating oil is strongly prevented from leaking into the compressor chamber at all times.

We claim:

1. A non-contact type seal device for a turbocharger, comprising:
   a retainer mounted in a compressor chamber of a housing of said turbocharger;
   a collar attached to a compressor wheel mounting portion of a rotor shaft of said turbocharger; and
   a ring provided on an inner peripheral surface of said retainer,
   an annular groove receiving said ring being formed in an outer peripheral surface of said collar;
   a first gap being formed between said outer peripheral surface of said collar and said inner peripheral surface of said retainer;
   a second gap being formed between the inner surface of said annular groove and each of inner and opposite end surfaces of said ring; and
   a threaded groove being formed in said inner peripheral surface of said retainer in opposition to said outer peripheral surface of said collar.

2. The non-contact type seal device of claim 1, wherein said threaded groove is formed on a lubricating oil chamber side inner peripheral surface of said retainer.

3. The non-contact type seal device of claim 1, wherein said threaded groove is formed in an inner peripheral surface of said retainer at a compressor chamber side thereof.

4. The non-contact type seal device of claim 1, wherein a cross-sectional shape of said threaded groove is selected from the group consisting of a triangular cross section, a square cross section, a trapezoidal cross section, a sawtooth cross section with one side perpendicular to said inner peripheral surface of said retainer, and a circular arc.

* * * * *